2,951,786

BACTERICIDAL AND FUNGICIDAL COMPOSITIONS COMPRISING PENTAHALOPHENYL N-(PHENYL)CARBAMATES

Joe W. Pullen, Pittsburg, Kans., Ralph P. Neighbors, Miami, Okla., Clayton F. Clark, Webb City, Mo., Otto L. Hoffmann, Pittsburg, Kans., and Alfred C. Meunier, Joplin, Mo., assignors to Spencer Chemical Company, a corporation of Missouri No Drawing. Filed Jan. 14, 1955, Ser. No. 481,972

18 Claims. (Cl. 167—30)

This invention relates to carbamate compounds.

This application is a continuation-in-part of our copending application Serial No. 440,552, filed June 30, 1954 and now abandoned.

According to the present invention there is provided novel pentahalophenyl carbamates (III) of the formula

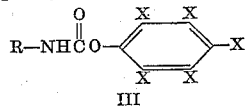

III wherein X is a halogen, such as chlorine or bromine, and R is phenyl or a nuclear-substituted phenyl group.

Compounds of the above formula have been found to exert bactericidal and fungicidal activity and to be highly effective agents for preventing deterioration of fabric and wood.

There is also provided by this invention novel compositions comprising, as an active ingredient, at least one such pentahalophenyl carbamate combined with a suitable inert carrier or diluent. Such compositions will be seen to be adaptable to the specific environment in which the pentahalophenyl carbamate is to be used for its beneficial effect.

Production of the pentahalophenyl N-(phenyl) carbamates may be achieved by at least two methods. In the first and preferred method, a pentahalophenol (I) is reacted with phenyl isocyanate or a nuclear-substituted phenyl isocyanate (II) to produce the desired pentahalophenyl N-(phenyl) carbamates. This reaction may be represented as follows:

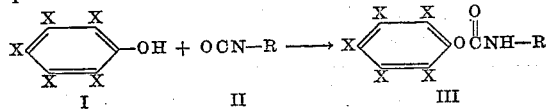

wherein X and R have the significance previously assigned.

In a second method of preparation, a pentahalophenyl haloformate is reacted with aniline or a nuclear-substituted aniline to produce the corresponding pentahalophenyl N-(phenyl) carbamates. This reaction may be illustrated as follows:

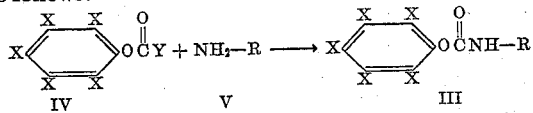

wherein X and R have the same significance as assigned above and Y is a reactive halogen, such as bromine or chlorine.

In the first method described above, reaction is achieved by contacting a pentahalophenol and a phenyl isocyanate in the presence of an inert reaction medium. Solvents such as benzene, ether, carbontetrachloride, and chloroform may be used for this purpose. Essentially anhydrous reaction conditions are considered desirable as highest yields are thereby attained. The presence of a basic substance such as pyridine is useful to bar adverse effects caused by acid formed in the reaction. Room temperature and somewhat higher and lower temperatures thereto are suitable for the reaction. At such temperatures, it goes to completion in a short time, three hours ordinarily being adequate. Most of the pentahalophenyl N-(phenyl or substituted phenyl) carbamates so produced are relatively insoluble in most solvents and precipitate from solution. They may therefore be easily recovered by filtration. The more soluble compounds may be isolated by evaporation of the reaction mixture to dryness or other conventional methods.

In effecting the described reaction, pentahalophenols may be employed in which the halogen substituents are all reactive halogens such as chlorine and bromine.

In addition to phenyl isocyanate, nuclear substituted phenyl isocyanates may be used in the reaction to produce the corresponding pentahalophenyl N-(nuclear substituted phenyl) carbamates. The nuclear substituents may be one or more groups such as the halogens like bromine and chlorine, alkoxy, and alkyl groups, particularly those having up to and including eight carbons, and the cyano, nitro, and hydroxy groups. Specific nuclear substituted phenyl isocyanates which may be used are 3-chlorophenyl isocyanate, 4-bromophenyl isocyanate, 2-chlorophenyl isocyanate, 4-bromophenyl isocyanate, 2,4-dichlorophenyl isocyanate, 2,5-dichlorophenyl isocyanate, 3,4-dichlorophenyl isocyanate, 3,5-dichlorophenyl isocyanate, 2-methylphenyl isocyanate, 3-methylphenyl isocyanate, 2,4,5-trichlorophenyl isocyanate, 2,4,6-trichlorophenyl isocyanate, 2-methoxyphenyl isocyanate, 4-methoxyphenyl isocyanate and the like.

Examples of novel pentahalophenyl N-(phenyl or nuclear substituted phenyl) carbamates which may be produced are pentachlorophenyl N-phenylcarbamate, M.P. 184–186° C.; pentachlorophenyl N-(3-chlorophenyl) carbamate, M.P. 172–174° C.; pentabromophenyl N-(3-chlorophenyl) carbamate, pentachlorophenyl N-(4-bromophenyl) carbamate, 190–191.5° C.; pentachlorophenyl N-(2-chlorophenyl) carbamate, M.P. 157–159° C.; pentachlorophenyl N-(4-chlorophenyl) carbamate, M.P. 174–176° C.; pentachlorophenyl N-(2,4-dichlorophenyl) carbamate, M.P. 171–173° C.; pentachlorophenyl N-(2,5-dichlorophenyl) carbamate, M.P. 179–180° C.; pentachlorophenyl N-(3,4-dichlorophenyl) carbamate, M.P. 174–176° C.; pentachlorophenyl N-(3,5-dichlorophenyl) carbamate, M.P. 185–187° C.; pentachlorophenyl N-(2-methylphenyl) carbamate, M.P. 164–166° C.; pentachlorophenyl N-(3-methylphenyl) carbamate, M.P. 169.5–171.5° C.; pentachlorophenyl N-(2,4,5-trichlorophenyl) carbamate, M.P. 191–192° C.; pentachloro phenyl N-(2,4,6-trichlorophenyl) carbamate, M.P. 170–173° C.; pentachlorophenyl N-(2-methoxyphenyl) carbamate, M.P. 168–169.5° C.; and pentachlorophenyl N-(4-methoxyphenyl) carbamate, M.P. 191–193° C.

These and similar compounds may also be produced by the second or alternative method outlined above. In this second procedure, pentahalophenyl haloformates such as pentachlorophenyl chloroformate and pentabromophenyl chloroformate may be used as one starting material. The other starting material may be aniline or a nuclear-substituted aniline, said substituents being groups as previously set forth hereinabove in regard to the phenyl isocyanates. This reaction proceeds under the conditions described in regard to the first method of preparation and the product may be recovered as indicated in that connection.

According to a further embodiment of this invention there is provided novel compositions comprising a pentahalophenyl N-(phenyl or nuclear-substituted phenyl) carbamate, as an active ingredient, combined with a suitable carrier or diluent. Such compositions are highly useful in preventing deterioration of wood, fabrics, plastics, paper, leather, and other materials which are subject to the adverse action of bacteria and fungi. Concentrations of 0.05 to about 5.0% of active carbamate are entirely satisfactory for this purpose.

Such novel compositions are conveniently produced by dispersing one or more of the active carbamates with a carrier appropriate for the intended use. Such carriers may be either solids like powdered talc, attapulgas clay, and saw-dust or liquids in which the active agent may be either dissolved or dispersed, such as water, kerosene, acetone, turpentine, benzene, linseed oil, paint, creosote, glycerol, and the like. Emulsifying agents may be used to achieve a suitable emulsion if two immiscible liquids are used as the carrier. Emulsifying agents can also be used to disperse the active carbamates in liquids in which they are not soluble. The resulting compositions may be applied by spraying, dusting, dipping, painting, and as aerosols.

In the treatment of porous materials such as cloth, felt, leather, and other fibrous materials, it is generally best to employ compositions in which the carrier is volatile and, of course, nondeleterious to the material to be protected. After the volatile solvent has evaporated the active carbamate remains in the material, evenly dispersed throughout. A nonvolatile liquid is desirable as a carrier for treating lumber, posts, and the like to insure maximum penetration of the carbamate.

The active carbamates may be used to protect various surfaces by incorporating them in glues, waxes, paints, pastes, varnishes, polishes, and stains. The carbamates may be added directly to such substances or they may be added first to a liquid or powdered carrier and then mixed with such glues, waxes, etc.

One typical composition can be prepared as follows:
A gram of an active carbamate is added to 1 ml. of a solution containing the following ingredients by volume: kerosene, 71%; Emcol H-77, 21%; and Emcol H-85A, 8%. Emcol H-77 and Emcol H-85A are commercial emulsifying agents. Water is added slowly with stirring until the carbamate is suspended in the desired concentration.

The solubility data in Table I on various carbamates will provide a useful guide in the preparation of a wide variety of other liquid compositions which may be used to protect against bacterial and fungal activity.

TABLE I

| Carrier | Solubility At Room Temperature of Carbamate (gms./100 ml.) | | | | | | |
|---|---|---|---|---|---|---|---|
| | A | B | C | D | E | F | G |
| Acetone | 10+ | 5-10 | 1-2.5 | 10+ | 2.5-5 | 10+ | 9-10 |
| Kerosene | <1 | <1 | <1 | <1 | <1 | <1 | <1 |
| Triethanolamine | <1 | <1 | <1 | <1 | <1 | <1 | <1 |
| Cresol | 2.5 | <1 | <1 | 5-10 | <1 | <1 | 1-2.5 |
| Ethanol | <1 | <1 | <1 | 1-2.5 | <1 | <1 | 2.5-5 |
| 1,4-Dioxane | 5 | 10+ | 1-2.5 | 10+ | 10+ | <1 | 2.5-5 |
| Cyclohexanone | 10+ | 10+ | 10+ | 10+ | 10+ | 10+ | 10+ |
| Chlorobenzene | <1 | <1 | <1 | 2.5-5 | <1 | <1 | <1 |
| Stanisol | <1 | <1 | <1 | <1 | <1 | <1 | <1 |
| Linseed Oil | <1 | <1 | <1 | <1 | <1 | 1-2.5 | <1 |

Key:
A. Pentachlorophenyl N-(3-chlorophenyl) carbamate.
B. Pentachlorophenyl N-(2-chlorophenyl) carbamate.
C. Pentachlorophenyl N-(4-chlorophenyl) carbamate.
D. Pentachlorophenyl N-(2,4-dichlorophenyl) carbamate.
E. Pentachlorophenyl N-(3,4-dichlorophenyl) carbamate.
F. Pentachlorophenyl N-(3,5-dichlorophenyl) carbamate.
G. Pentachlorophenyl N-phenyl carbamate.

The novel pentahalophenyl N-(phenyl or nuclear-substituted phenyl) carbamates provided by this invention were found to be antibacterial and antifungal and to prevent deterioration of fabric. This was discovered by a testing procedure in which three replicates of 8 oz. cotton duck are immersed in a solution of the carbamate in acetone. Various concentrations of carbamate were used to determine the effectiveness at different levels. The fabric was then removed from the solution, dried and buried in greenhouse soil. Three pieces of untreated cotton duck of the same size were buried at the same time and used as checks or controls. The pieces were buried at uniform depth. The treated fabric was observed when the untreated checks no longer possessed significant tensile strength. The three treated pieces were then reburied with three new check pieces. This procedure was continued until the three treated pieces no longer possessed significant tensile strength. The results of this test employing representative carbamates are compiled in Table II following.

TABLE II

*Effectiveness of pentahalophenyl N-(phenyl) carbamates for preventing fabric deterioration*

| Chemical | Fabric Rating | | | | | | | | | |
|---|---|---|---|---|---|---|---|---|---|---|
| | Concentration of Carbamate in Treating Solution | | | | | | | | | |
| | 1% | | ½% | | ¼% | | ⅛% | | 1%-Leached c | |
| | (a) Time | (b) Checks | (a) Time | (b) Checks | (a) Time | (b) Checks | (a) Time | (b) Checks | (a) Time | (b) Checks |
| pentachlorophenyl N-(4-bromophenyl)carbamate | 31 | 3 | 31 | 3 | 31 | 3 | 31 | 3 | 31 | 3 |
| pentachlorophenyl N-(2-chlorophenyl)carbamate | 37 | 4 | 37 | 4 | 28 | 3 | 20 | 2 | 37 | 4 |
| pentachlorophenyl N-(3-chlorophenyl)carbamate | 37 | 4 | 37 | 4 | 28 | 3 | 28 | 3 | 37 | 4 |
| pentachlorophenyl N-(4-chlorophenyl)carbamate | 45 | 5 | 37 | 4 | 28 | 3 | 28 | 3 | 37 | 4 |
| pentachlorophenyl N-(2,4-dichlorophenyl)carbamate | 37 | 4 | 28 | 3 | 28 | 3 | 28 | 3 | 37 | 4 |
| pentachlorophenyl N-(2,5-dichlorophenyl)carbamate | 31 | 3 | 31 | 3 | 31 | 3 | 20 | 2 | 31 | 3 |
| pentachlorophenyl N-(3,4-dichlorophenyl)carbamate | 45 | 5 | 37 | 4 | 37 | 4 | 28 | 3 | 28 | 3 |
| pentachlorophenyl N-(3,5-dichlorophenyl)carbamate | 38 | 4 | 38 | 4 | 27 | 3 | 27 | 3 | 27 | 3 |
| pentachlorophenyl N-(2-methylphenyl)carbamate | 36 | 3 | 36 | 3 | 26 | 2 | 26 | 2 | 26 | 2 |
| pentachlorophenyl N-(3-methylphenyl)carbamate | 36 | 3 | 36 | 3 | 26 | 2 | 26 | 2 | 26 | 2 |
| pentachlorophenyl N-phenylcarbamate | 37 | 4 | 28 | 3 | 28 | 3 | 19 | 2 | 28 | 3 | a Time in days that treated fabric was buried before it no longer had significant tensile strength.
b Number of groups of consecutive checks that deteriorated until they lacked significant tensile strength in the time required for the treated fabric to deteriorate to the same degree.
c Fabric leached 24 hours in running water after carbamate treatment but before burial.

These results indicate that the carbamate-treated fabrics last at least from two to five times longer than does untreated fabric under the harsh conditions existing in greenhouse soil. Since the fungi Myrothecium and the bacteria Cytophaga, along with others, exist in abundance in greenhouse soil, it is established that these novel carbamates have a pronounced effect in protecting fabrics and the like against these organisms.

In addition to the test described, the same carbamates were tested for resistance to leaching. This was done by taking dry, treated cotton duck replicates prepared as above and immersing them in running water for 24 hours. The pieces were then dried and buried with untreated, washed checks. The test procedure was then followed as with the unleached pieces. The results are presented in the last column of Table II. These results show that the carbamates are highly resistant to leaching yet effective against bacteria and fungi.

These carbamates have extremely low mammalian toxicity. Pentachlorophenyl N-(3-chlorophenyl) carbamate is typical. It has a rate of 1.38 mgs./kg. and in 1% and 2% concentrations was found by patch tests on humans to show no signs of irritation.

Pentachlorophenyl N-(3-chlorophenyl) carbamates was one of the first compounds prepared in this invention and has accordingly been more extensively tested. This compound does not stain white textiles nor leave a residue noticeable on colored textiles even when viewed under 90 power magnification. After a piece of board extensively stained with a blue wood fungi was treated with a solution of pentachlorophenyl N-(3-chlorophenyl) carbamate the mold was not only inhibited but the blue stain itself disappeared almost completely.

The following examples are added only to illustrate methods of preparing specific carbamates within the scope of the invention. The invention is not to be restricted to those examples.

EXAMPLE 1.—PENTACHLOROPHENYL (N-PHENYL) CARBAMATE

A mixture of 0.20 mole of phenyl isocyanate, 0.20 mole of pentachlorophenol, 175 ml. of benzene and 5 drops of pyridine was refluxed two hours and then let stand overnight. The mixture was then heated, an equal volume of n-hexane added and the whole cooled to room temperature. Pentachlorophenyl N-(phenyl) carbamate was filtered off, washed with a little n-hexane and then air-dried; M.P. 184–186° C.

EXAMPLE 2.—PENTACHLOROPHENYL N-(3-CHLOROPHENYL) CARBAMATE 38.8 ml. of a solution containing carbon tetrachloride and 0.2 mole of 3-chlorophenyl isocyanate was added to a solution of 58.3 grams of pentachlorophenol in 300 ml. of benzene. Four drops of pyridine were added and the mixture then refluxed for four hours. The benzene was then removed by evaporation and the residual white solid was recrystallized from a mixture of benzene and n-hexane. The white solid after drying, weighed 74.0 grams, M.P. 169–171° C. Total N found (Dumas): 3.22%; calculated: 3.34%. Infrared absorption data confirmed the structure as pentachlorophenyl N-(3-chlorophenyl) carbamate.

Pentachlorophenyl N-(3-chlorophenyl) carbamate may be made also by the reaction of the corresponding chloroformate and amine.

Pentachlorophenyl N-(3-chlorophenyl) carbamate is soluble at 29° C. to the extent of greater than one part by weight per 200 parts by volume in the following solvents: high flash naphtha, diacetone alcohol, methanol, isopropyl alcohol, and trichloroethylene; and to the extent of greater than one part by weight per 100 parts by volume in the following solvents: ethyl acetate, acetone, methyl ethyl ketone, dioxane, benzene, xylene, linseed oil, and nitrobenzene.

EXAMPLE 3.—PENTACHLOROPHENYL N-(3,5-DICHLOROPHENYL) CARBAMATE

A solution of 16.2 g. (0.10 mole) of 3,5-dichloroaniline in 200 ml. of benzene was stirred and treated dropwise and simultaneously with two liquids from separate dropping funnels. One liquid consisted of a solution of 32.9 g. (0.10 mole) of pentachlorophenyl chloroformate in 150 ml. of benzene. The second liquid consisted of 12.7 ml. (0.10 mole) of dimethylaniline. The temperature of the reaction was maintained at 15° C. during addition. After addition was completed, the mixture was allowed to warm to room temperature while stirring, then stirred an additional two hours. Pentachlorophenyl N-(3,5-dichlorophenyl) carbamate precipitated and was filtered off and washed successively with n-hexane, dilute hydrochloric acid, water, and n-hexane. It was then air-dried; M.P. 185–187° C.

Pentachlorophenyl N-(3,5-dichlorophenyl) carbamate may also be prepared by the reaction of pentachlorophenol with 3,5-dichlorophenyl isocyanate.

EXAMPLE 4.—PENTACHLOROPHENYL N-(4-CHLOROPHENYL) CARBAMATE

A solution of 0.10 mole of 4-chloroaniline in 200 ml. of benzene was stirred and treated dropwise and simultaneously with two liquids from separate dropping funnels. One liquid consisted of a solution of 0.10 mole of pentachlorophenyl chloroformate in 150 ml. of benzene. The second liquid consisted of 0.11 mole of dimethylaniline. The temperature of the reaction was maintained at 10° C. during addition. After addition was completed, the mixture was stirred an additional hour at 10° C., then allowed to warm to room temperature and stirred two hours longer. Pentachlorophenyl N-(4-chlorophenyl) carbamate was filtered off, washed with dilute hydrochloric acid, water and then n-hexane. It was then air-dried; M.P. 174–176° C.

Pentachlorophenyl N-(4-chlorophenyl) carbamate also can be made by the reaction of pentachlorophenol with 4-chlorophenyl isocyanate.

EXAMPLE 5.—PENTACHLOROPHENYL N-(2-CHLOROPHENYL) CARBAMATE

A mixture of 0.15 mole of 2-chlorophenyl isocyanate, 0.15 mole of pentachlorophenol, 300 ml. of benzene and 5 drops of pyridine was refluxed four hours and then let stand overnight. The benzene was then removed by evaporation. The solid residue was dissolved in a mixture of benzene and n-hexane, treated with charcoal and filtered. Upon cooling, pentachlorophenyl N-(2-chlorophenyl) carbamate was obtained and air-dried; M.P. 157–158.5° C.

EXAMPLE 6.—PENTACHLOROPHENYL N-(3,4-DICHLOROPHENYL) CARBAMATE

A solution of 0.09 mole of 3,4-dichloroaniline in 200 ml. of benzene was stirred and treated dropwise and simultaneously with two liquids from separate dropping funnels. One liquid consisted of a solution of 0.09 mole of pentachlorophenyl chloroformate in 150 ml. of benzene. The second liquid consisted of 0.10 mole of dimethylaniline. The temperature of the reaction mixture was maintained at 15–28° C. during addition. After addition was completed, the mixture was stirred for three hours at room temperature. Pentachlorophenyl N-(3,4-dichlorophenyl) carbamate precipitated. It was filtered, washed with 800 ml. of dilute hydrochloric acid, water, and n-hexane and air-dried; M.P. 174–176° C.

Pentachlorophenyl N-(3,4-dichlorophenyl) carbamate can also be made by the reaction of pentachlorophenol with 3,4-dichlorophenyl isocyanate.

EXAMPLE 7.—PENTACHLOROPHENYL N-(2,4-DICHLOROPHENYL) CARBAMATE

A solution of 0.10 mole of 2,4-dichloroaniline in 200 ml. of benzene was stirred and treated dropwise and simultaneously with two liquids from separate dropping funnels. One liquid consisted of a solution of 0.10 mole of pentachlorophenyl chloroformate in 150 ml. of benzene. The second liquid consisted of 0.11 mole of dimethylaniline. The temperature of the reaction was maintained at 15–28° C. during addition. After addition was completed, the mixture was allowed to warm to room temperature while stirring, then stirred an additional three hours. Pentachlorophenyl N-(2,4-dichlorophenyl) carbamate was filtered off, washed with dilute hydrochloric acid, water, and n-hexane. After air-drying it had a melting point of 170–172° C.

Pentachlorophenyl N-(2,4-dichlorophenyl) carbamate may also be made by the reaction of 2,4-dichlorophenyl isocyanate with pentachlorophenol.

EXAMPLE 8.—PENTACHLOROPHENYL N-(3-METHYLPHENYL) CARBAMATE

A mixture of 0.10 mole of 3-methylphenyl isocyanate 0.10 of pentachlorophenol, 125 ml. of benzene, and 5 drops of pyridine was heated at reflux for 4 hours. Then 400 ml. of benzene and 600 ml. of n-hexane were added and the mixture cooled to 10° C. Pentachlorophenyl N-(3-methylphenyl) carbamate precipitated and was filtered off, washed with n-hexane and air-dried. The product was washed with carbon tetrachloride, and dissolved in benzene. Charcoal was added and the solution was heated and filtered. The filtrate was treated with twice its volume of n-hexane, cooled and filtered. The product was then recrystallized a second time from benzene-n-hexane; M.P. 169.5–171.5° C.

EXAMPLE 9.—PENTACHLOROPHENYL N-(2-METHYLPHENYL) CARBAMATE

A mixture of 0.10 mole of 2-methylphenyl isocyanate, 0.10 mole of pentachlorophenol, 125 ml. of benzene, and 5 drops of pyridine was heated at reflux for three hours, treated with charcoal and filtered. n-Hexane was added to the filtrate and the solution was cooled to crystallize pentachlorophenyl N - (2 - methylphenyl) carbamate. The product was filtered off, washed with n-hexane and air-dried. The product was washed with carbon tetrachloride, dissolved in benzene, the solution filtered, evaporated, n-hexane added and cooled. The product was filtered off, washed with n-hexane and dried in vacuo at 50° C.; M.P. 167–168° C. Infrared absorption data indicated the carbamate structure.

EXAMPLE 10.—PENTACHLOROPHENYL N-(4-BROMOPHENYL) CARBAMATE

A mixture of 0.10 mole of 4-bromophenyl isocyanate, 0.10 mole of pentachlorophenol, 125 ml. of benzene, and 5 drops of pyridine was heated at reflux for two hours. n-Hexane and additional benzene were added and the materials were then cooled to 10° C., filtered and the solid pentachlorophenyl N-(4-bromophenyl) carbamate air-dried. The product was washed with carbon tetrachloride, dissolved in benzene, the solution filtered, evaporated, n-hexane added, and then cooled. The product was filtered off, washed with n-hexane and dried in vacuo at 50° C.; M.P. 190–191.5° C. Infrared data confirmed the carbamate structure.

EXAMPLE 11.—PENTACHLOROPHENYL N-(2,4,5-TRICHLOROPHENYL) CARBAMATE

To 52.8 g. of 2,4,5-trichlorophenyl isocyanate dissolved in approximately 100 ml. of carbon tetrachloride were added 63.2 g. of pentachlorophenol. To this mixture were added 300 ml. of benzene and 10 drops of pyridine. The mixture was then heated at reflux for a short time and then 1400 ml. of additional benzene was added to maintain complete solution. Reflux was continued for a total of four hours. The mixture was filtered hot and the filtrate mixed with n-hexane. Upon cooling to 7° C. the mixture was filtered, the solid pentachlorophenyl N - (2,4,5 - trichlorophenyl) carbamate washed with n-hexane and air-dried overnight. Two additional crops were obtained by evaporation of the filtrate in each case at room temperature. The product was washed with carbon tetrachloride and dried in vacuo at 50° C.; M.P. 191–192° C.

EXAMPLE 12.—PENTACHLOROPHENYL N-(4-METHOXYPHENYL) CARBAMATE

To 150 ml. of benzene was added 0.10 mole of 4-methoxyphenyl isocyanate and 0.10 mole of pentachlorophenol. After 8 drops of pyridine was added the solution was heated at reflux for three hours. The mixture was poured into 700 ml. of ligroin and cooled to −10° C. Pentachlorophenyl N - (4 - methoxyphenyl) carbamate was filtered off and air-dried. The product was washed with carbon tetrachloride, dissolved in benzene, filtered, recrystallized from benzene-n-hexane, and dried in vacuo at 50° C.; M.P. 191.5–193° C.

EXAMPLE 13.—PENTACHLOROPHENYL N-(2,4,6-TRICHLOROPHENYL) CARBAMATE

To 31.1 g. of pentachlorophenol was added 26.0 g. of 2,4,6-trichlorophenyl isocyanate dissolved in a mixture of approximately 100 ml. of benzene and 100 ml. of carbon tetrachloride. Then, 100 ml. more of benzene and 10 drops of pyridine were added, and the entire mixture heated at reflux for four hours. The mixture was filtered hot and a small amount of precipitated solid was washed with 300 ml. of hot benzene. The combined filtrate and wash liquids were heated to boiling, 700 ml. of n-hexane were added and the materials were cooled to about −10° C., filtered, the solid pentachlorophenyl N - (2,4,6 - trichlorophenyl) carbamate washed with n-hexane and air-dried overnight. Three additional crops were obtained by allowing the filtrate in each case to stand at room temperature in an open beaker. The product was washed with carbon tetrachloride and dried in a vacuum oven at 50° C. The infrared absorption spectrum confirmed the carbamate structure.

Various changes and modifications of the invention can be made and, to the extent that such variations incorporate the spirit of this invention, they are intended to be included within the scope of the appended claims.

What is claimed is:

1. A composition for preventing deterioration by bacteria and fungi through bactericidal and fungicidal activity exerted by the composition comprising as an active essential ingredient a compound of the formula

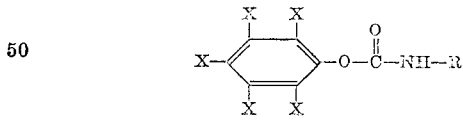

wherein X is a member of the group consisting of bromine and chlorine and R is a member of the group consisting of phenyl groups nuclearly substituted with at least one member of the group consisting of bromine, chlorine and lower alkoxy groups, an inert carrier and a surface active agent.

2. A composition according to claim 1 in which the active ingredient is present in a concentration of 0.05% to 5.0%.

3. The method of preventing deterioration by bacteria and fungi which comprises applying a bactericidal and fungicidal compound of the formula

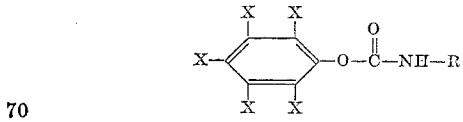

wherein X is a member of the group consisting of bromine and chlorine and R is a member of the group consisting of phenyl and phenyl groups nuclearly substituted with at least one member of the group consisting of bromine, chlorine, lower alkyl and lower alkoxy groups, to a substance subject to bacterial and fungal deterioration.

4. The method of preventing deterioration of a material by bacterial and fungal activity which comprises applying pentachlorophenyl N-phenylcarbamate to the material.

5. A composition for preventing deterioration by bacteria and fungi through bactericidal and fungicidal activity exerted by the composition comprising pentachlorophenyl N-(3-chlorophenyl) carbamate as an active essential ingredient, a surface active agent and an inert carrier.

6. A composition for preventing deterioration by bacteria and fungi through bactericidal and fungicidal activity exerted by the composition comprising pentachlorophenyl N-(2,4-dichlorophenyl) carbamate as an active essential ingredient, a surface active agent and an inert carrier.

7. A composition for preventing deterioration by bacteria and fungi through bactericidal and fungicidal activity exerted by the composition comprising pentachlorophenyl N-(3,4-dichlorophenyl) carbamate as an active essential ingredient, a surface active agent and an inert carrier.

8. The composition according to claim 5 in which the active ingredient is present in a concentration of 0.05% to 5.0%.

9. The composition according to claim 6 in which the active ingredient is present in a concentration of 0.05% to 5.0%.

10. The composition according to claim 7 in which the active ingredient is present in a concentration of 0.05% to 5.0%.

11. The method of killing bacteria and fungi which comprises contacting the bacteria and fungi with a compound of the formula

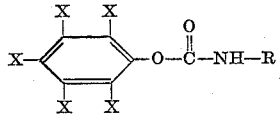

wherein X is a member of the group consisting of bromine and chlorine and R is a member of the group consisting of the phenyl and phenyl groups nuclearly substituted with at least one member of the group consisting of bromine, chlorine, lower alkyl and lower alkoxy groups.

12. The method of claim 3 in which the substance subject to bacterial deterioration is a member of the group consisting of wood and fabric.

13. The method of preventing deterioration of a material by bacterial and fungal activity which comprises applying pentachlorophenyl N-(bromophenyl) carbamate to the material.

14. The method of preventing deterioration of a material by bacterial and fungal activity which comprises applying pentachlorophenyl N-(dibromophenyl) carbamate to the material.

15. The method of preventing deterioration of a material by bacterial and fungal activity which comprises applying pentachlorophenyl N-(chlorophenyl)carbamate to the material.

16. The method of preventing deterioration of a material by bacterial and fungal activity which comprises applying pentachlorophenyl N-(dichlorophenyl)carbamate to the material.

17. The method of preventing deterioration of a material by bacterial and fungal activity which comprises applying pentachlorophenyl N-(2,4-dichlorophenyl)carbamate to the material.

18. The method of preventing deterioration of a material by bacterial and fungal activity which comprises applying pentachlorophenyl N-(4-chlorophenyl)carbamate to the material.

References Cited in the file of this patent

UNITED STATES PATENTS

| | | |
|---|---|---|
| 2,457,674 | Heuberger | Dec. 28, 1948 |
| 2,504,404 | Flenner | Apr. 18, 1950 |
| 2,520,586 | Weber et al. | Aug. 29, 1950 |
| 2,545,948 | Flenner | Mar. 20, 1951 |
| 2,570,664 | Gundel et al. | Oct. 9, 1951 |
| 2,588,428 | Stewart et al. | Mar. 11, 1952 |
| 2,621,143 | Goodhue et al. | Dec. 9, 1952 |
| 2,677,698 | Deutschman et al. | May 4, 1954 |
| 2,692,899 | Kolka et al. | Oct. 26, 1954 |
| 2,734,911 | Strain | Feb. 14, 1956 |
| 2,858,328 | Beaver et al. | Oct. 28, 1958 |

OTHER REFERENCES

Beilstein: XII, 327 (1929).

Thompson: Botanical Gazette, vol. 107, pp. 475–507, pp. 479–481 and 504 particularly relied on.